US011860046B1

(12) United States Patent
Moore et al.

(10) Patent No.: US 11,860,046 B1
(45) Date of Patent: Jan. 2, 2024

(54) TEMPERATURE SENSOR

(71) Applicant: Acacia Communications, Inc., Maynard, MA (US)

(72) Inventors: Ryan Moore, Chelsea (CA); Christopher Doerr, Middletown, NJ (US)

(73) Assignee: ACACIA COMMUNICATIONS, INC., Maynard, MA (US)

(*) Notice: Subject to any disclaimer, the term of this patent is extended or adjusted under 35 U.S.C. 154(b) by 487 days.

(21) Appl. No.: 17/185,419

(22) Filed: Feb. 25, 2021

(51) Int. Cl.
G01K 7/16 (2006.01)
(52) U.S. Cl.
CPC ........... G01K 7/16 (2013.01); G01K 2217/00 (2013.01)
(58) Field of Classification Search
CPC ....................................................... G01K 7/16
USPC ........................................................ 327/512
See application file for complete search history.

(56) References Cited

U.S. PATENT DOCUMENTS

| 2012/0181157 A1* | 7/2012 | Wan ................. H01H 71/70 200/501 |
| 2015/0378376 A1* | 12/2015 | Matsui ................. G05F 1/463 327/513 |
| 2018/0146297 A1* | 5/2018 | Muehlbacher ......... H04R 11/04 |
| 2020/0388558 A1* | 12/2020 | Tani .................... H02M 7/5387 |

* cited by examiner

Primary Examiner — Tomi Skibinski
(74) Attorney, Agent, or Firm — K&L GATES LLP

(57) ABSTRACT

A system and method of measuring a temperature including applying a first set of voltages across a circuit in sequence; detecting a second set of voltages corresponding to the first set of voltages, wherein the second set of voltages includes a first detected voltage, a second detected voltage, and a third detected voltage, wherein the first applied voltage corresponds to the first detected voltage, the second applied voltage corresponds to the second detected voltage, and a third applied voltage corresponds to the third detected voltage; modifying an output of a heater proximate to the diode within the circuit, wherein a combined heat dissipation of the heater and the diode remains constant during operation of the circuit; and determining a temperature proximate to the diode based on the first set of voltages and the second set of voltages.

20 Claims, 3 Drawing Sheets

TEMPERATURE SENSOR

FIELD

This disclosure relates generally to the field of integrated circuits.

BACKGROUND

Contemporary optical communications and other photonic systems make extensive use of photonic integrated circuits that are advantageously mass-produced in various configurations for various purposes.

SUMMARY

In part, in one aspect, the disclosure relates to a method of measuring a temperature, the method comprising applying a first set of voltages across a circuit in sequence, wherein the circuit comprises a diode and a resistor in series, wherein the first set of voltages includes a first applied voltage ($V_1$), a second applied voltage ($V_2$), and a third applied voltage ($V_3$); detecting a second set of voltages across the said diode corresponding to the first set of voltages, wherein the second set of voltages includes a first detected voltage ($V_{D1}$), a second detected voltage ($V_{D2}$), and a third detected voltage ($V_{D3}$), wherein the first applied voltage ($V_1$) corresponds to the first detected voltage ($V_{D1}$), the second applied voltage ($V_2$) corresponds to the second detected voltage ($V_{D2}$), and a third applied voltage ($V_3$) corresponds to the third detected voltage ($V_{D3}$); and determining a temperature proximate to the diode based on the first set of voltages and the second set of voltages.

In one embodiment, the method is further comprising where the temperature measurement is performed relative to an integrated temperature sensor positioned relative to an application specific integrated circuit (ASIC). In one embodiment, the method is further comprising where the temperature measurement is performed relative to an integrated temperature sensor positioned relative to one or more components of a photonic circuit. In one embodiment, the method is further comprising where the second applied voltage ($V_2$) is about two times the first applied voltage ($V_1$). In one embodiment, the method is further comprising where the third applied voltage ($V_3$) is about two times the second applied voltage ($V_2$). In one embodiment, the method is further comprising where determining the temperature includes calculating the temperature according to the equation of $$T = \frac{q}{nk} \frac{V_{D1} - V_{D3} - \frac{V_1 - V_3 - V_{D1} + V_{D3}}{V_2 - V_3 - V_{D2} + V_{D3}}(V_{D2} - V_{D3})}{\ln\left(\frac{V_1 - V_{D1}}{V_3 - V_{D3}}\right) - \frac{V_1 - V_3 - V_{D1} + V_{D3}}{V_2 - V_3 - V_{D2} + V_{D3}}\ln\left(\frac{V_2 - V_{D2}}{V_3 - V_{D3}}\right)}$$

based on the first set of voltages and the second set of voltages, wherein 'q' is the charge of an electron, 'n' is the ideality factor of the diode, and k is the Boltzmann's constant. In one embodiment, the method is further comprising modifying an output of a heater proximate to the diode within the circuit, wherein a combined heat dissipation of the heater and the diode remains constant during operation of the circuit.

In part, in one aspect, the disclosure relates to a method of periodically measuring a temperature proximate to a circuit, the method comprising periodically applying voltages across a temperature sensitive diode wherein the voltages includes a first voltage ($V_1$), second voltage ($V_2$), and a third voltage ($V_3$); measuring a first measured voltage ($V_{D1}$), second measured voltage ($V_{D2}$), and a third measured voltage ($V_{D3}$) corresponding to the first voltage ($V_1$), second voltage ($V_2$), and third voltage respectively ($V_3$). respectively; and determining the temperature proximate to the circuit based on the first voltage ($V_1$), second voltage ($V_2$), third voltage ($V_3$), first measured voltage ($V_{D1}$), second measured voltage ($V_{D2}$), and third measured voltage ($V_{D3}$).

In one embodiment, the method is further comprising where determining the temperature includes calculating the temperature according to the equation of $$T = \frac{q}{nk} \frac{V_{D1} - V_{D3} - \frac{V_1 - V_3 - V_{D1} + V_{D3}}{V_2 - V_3 - V_{D2} + V_{D3}}(V_{D2} - V_{D3})}{\ln\left(\frac{V_1 - V_{D1}}{V_3 - V_{D3}}\right) - \frac{V_1 - V_3 - V_{D1} + V_{D3}}{V_2 - V_3 - V_{D2} + V_{D3}}\ln\left(\frac{V_2 - V_{D2}}{V_3 - V_{D3}}\right)}$$

based on the first voltage ($V_1$), the second voltage ($V_2$), the third voltage ($V_3$), the first measured voltage ($V_{D1}$), the second measured voltage ($V_{D2}$), and the third measured voltage ($V_{D3}$), wherein 'q' is the charge of an electron, 'n' is the ideality factor of the diode, and k is the Boltzmann's constant. In one embodiment, the method is further comprising where the temperature measurement is performed relative to an integrated temperature sensor positioned relative to the circuit. In one embodiment, the method is further comprising where the second applied voltage ($V_2$) is about two times the first applied voltage ($V_1$) and the third applied voltage ($V_3$) is about two times the second applied voltage ($V_2$). In one embodiment, the method is further comprising modifying an output of a heater proximate to the diode, wherein a combined heat dissipation of the heater and the diode remains constant during operation of the diode. In one embodiment, the method is further comprising where the circuit is a microprocessor. In one embodiment, the method is further comprising where the circuit is a field programmable gate array (FPGA).

In part, in one aspect, the disclosure relates to a system comprising a temperature sensor including: a power source; a diode electrically connected to the power source; a resistor in series with the diode; and a heater proximate to the diode; wherein the power source is operable to apply a voltage across the diode; and a circuit configured to: apply a first set of voltages across the diode, wherein the first set of voltages includes a first applied voltage ($V_1$), a second applied voltage ($V_2$), and a third applied voltage ($V_3$); detect a second set of voltages, wherein the second set of voltages includes a first detected voltage ($V_{D1}$), a second detected voltage ($V_{D2}$), and a third detected voltage ($V_{D3}$); and determine the temperature proximate to the circuit based on the first set of voltages and the second set of voltages.

In one embodiment, the system further comprises where determining the temperature includes calculating the temperature according to the equation of $$T = \frac{q}{nk} \frac{V_{D1} - V_{D3} - \frac{V_1 - V_3 - V_{D1} + V_{D3}}{V_2 - V_3 - V_{D2} + V_{D3}}(V_{D2} - V_{D3})}{\ln\left(\frac{V_1 - V_{D1}}{V_3 - V_{D3}}\right) - \frac{V_1 - V_3 - V_{D1} + V_{D3}}{V_2 - V_3 - V_{D2} + V_{D3}}\ln\left(\frac{V_2 - V_{D2}}{V_3 - V_{D3}}\right)}$$

based on the first set of voltages and the second set of voltages, where 'q' is the charge of an electron, 'n' is the ideality factor of the diode, and k is the Boltzmann's constant. In one embodiment, the system further comprises where the first set of voltages are applied sequentially across the diode. In one embodiment, the system further comprises where the circuit is further configured to modify an output of the heater proximate to the diode, wherein a combined heat dissipation of the heater and the diode remains constant during operation of the circuit. In one embodiment, the system further comprises where the circuit is a microprocessor. In one embodiment, the system further comprises where the circuit is an application specific integrated circuit.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
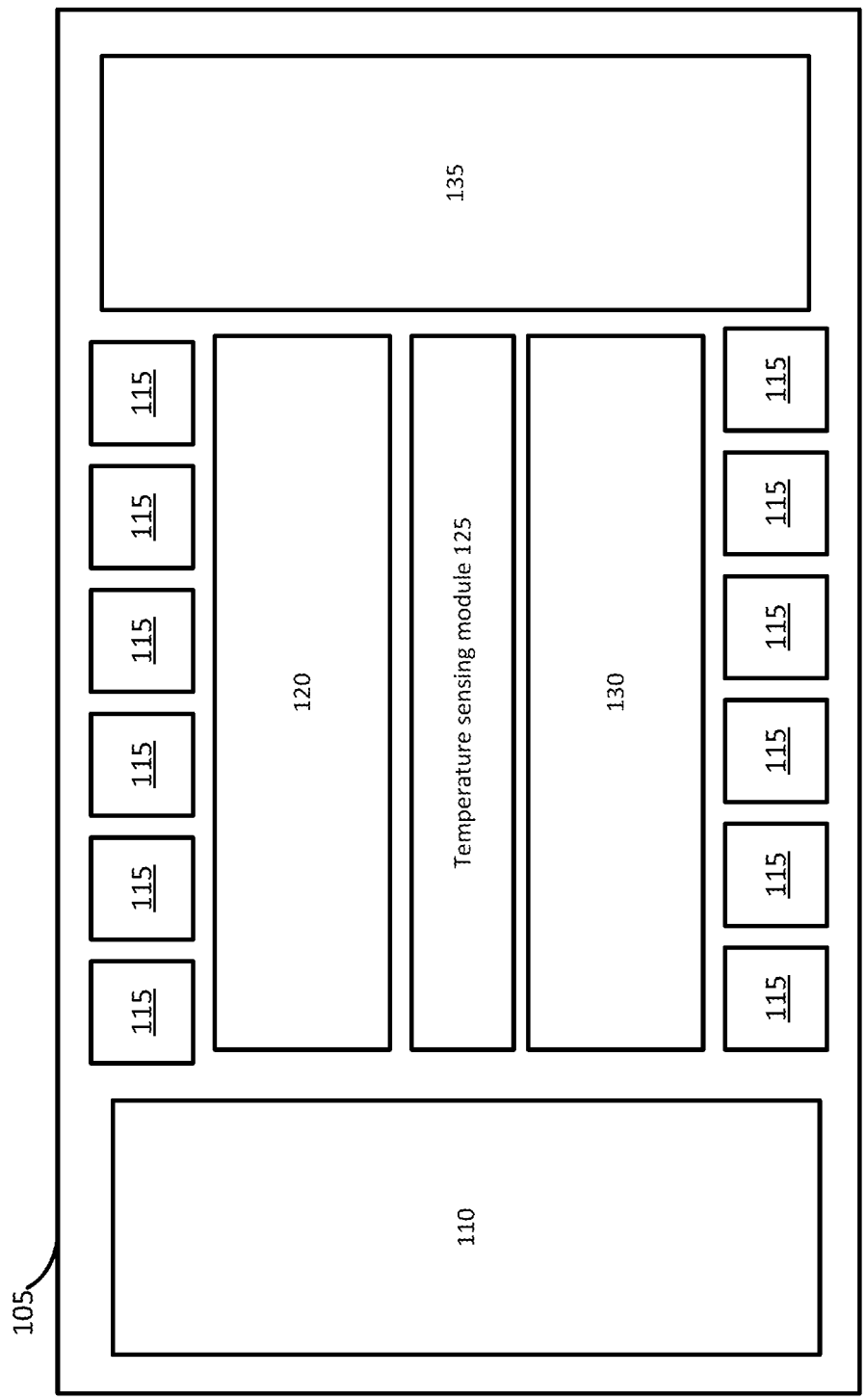
FIG. 1 illustrates a high level component diagram of a system implementing a diode temperature sensor within an application specific integrated circuit (ASIC), in accordance with one or more aspects of the disclosure.

In various embodiments, the disclosure may relate to design and implementation of a temperature sensor and methods of determining a temperature value. In some embodiments, a temperature sensor may be integrated within an application specific integrated circuit (ASIC) or other photonic circuits, devices, and assemblies. In many embodiments, a temperature sensor may include an analysis module, a diode and a resistor in series. In most embodiments, analysis module may measure various outputs (e.g., voltage), set and/or retrieve inputs into the temperature sensor, and/or determine a temperature proximate to the temperature sensor based on the inputs and outputs of the temperature sensor.

In certain embodiments, a temperature sensor may be included within a temperature sensing module. In various embodiments, a temperature sensing module may be a standalone module and/or device. In some embodiments, a temperature sensing module may be implemented within a circuit. In various embodiments, a circuit may include, but is not limited to: a microprocessor, an application specific integrated circuit, a photonic circuit, a field programmable gate array (FPGA), and/or other types of circuits. In various embodiments, a temperature sensing module may include a power source, processor, memory, sensor, and a heating element. (e.g., a small heater). In many embodiments, a sensor may include a diode and a resistor in series. In some embodiments, a sensor may be comprised of a diode. In certain embodiments, a heating element may be located proximate to a diode to balance heat dissipated by the diode during operation of a temperature sensor. In many embodiments, a processor may direct a power source to apply a plurality of voltages across the sensor to determine a temperature proximate to a diode. In other embodiments, a temperature sensor and/or sensing module may be incorporated into an ASIC, photonic integrated circuit, and/or other device.

In some embodiments, a temperature sensing module and/or a temperature sensor incorporated within a circuit, ASIC, PIC, and/or other device may derive a current source, processing power, memory, and/or a heating source from the circuit, ASIC, PIC, or device. In certain embodiments, a temperature sensor may draw a current from an external power source to apply a voltage across a diode within the temperature sensor to determine a current temperature. In other embodiments, a temperature sensor may process inputs and measured outputs external to the temperature sensor.

In various embodiments, a temperature sensing module and/or a temperature sensor may measure a temperature value by processing inputs and outputs generated by applying three sequential voltages across a series resistor connected to a diode temperature sensor. In most embodiments, a temperature may be determine from a first input voltage, a second input voltage, a third input voltage, a first measured output voltage, a second measured output voltage, and a third measured output voltage in combination with the charge of an electron ('q'), the ideality factor of a diode within a diode temperature sensor, and the Boltzmann's constant.

For example, in various embodiments, a diode temperature sensor may be implemented within an ASIC and used to detect temperature proximate to various temperature sensitive components on the ASIC. In certain embodiments, current 'I' through an ideal diode may be given by equation (1) shown below.

$$I = I_0 \left( e^{\frac{qV}{nkT}} - 1 \right) \qquad (1)$$

In some embodiments, as shown in equation (1), '$I_0$' may represent dark current, 'q' may represent the charge of an electron, 'V' may represent the voltage across the ideal diode, 'n' may represent a diode ideality factor, 'k' may be a Boltzmann's constant, and 'T' may be temperature in Kelvin proximate to the diode. In most embodiments, if a diode has a series resistance '$R_s$' (shown in FIG. 2), equation (1) may become equation (2), shown below, which ignores self heating of the diode from the measurement current.

$$I = I_0 \left( e^{\frac{q(V_D - IR_S)}{nkT}} - 1 \right) \quad (2)$$

In certain embodiments, assuming the diode may be forward biased (i.e., $\exp[qV_D/(nkT)] \gg 1$), equation (2) may be approximately equation (3) shown below.

$$I \approx I_0 e^{\frac{q(V_D - IR_S)}{nkT}} \quad (3)$$

In many embodiments, with respect to equation (3), 'n' may be assumed to be fixed and may not change with temperature or time and may be the same in every laser. In certain embodiments, $I_0$, $R_s$, and T may be assumed to vary with temperature and time and are measured constantly.

In certain embodiments, using equation (3), temperature proximate to the diode temperature sensor may be determined from knowing three different voltages applied across a series resistor connected to the diode temperature sensor and measuring three resulting voltages across the diode temperature sensor. In some embodiments, a temperature proximate to a diode temperature sensor may be determined from determining a temperature of the diode itself. In various embodiments, equations (4), (5), and (6) may represent voltages applied and voltages measured with respect to equation 3 (shown above).

$$\ln\left(\frac{I_1}{I_0}\right) = \frac{q}{nkT}[V_{D1} - I_1 R_S] \quad (4)$$

$$\ln\left(\frac{I_2}{I_0}\right) = \frac{q}{nkT}[V_{D2} - I_2 R_S] \quad (5)$$

$$\ln\left(\frac{I_3}{I_0}\right) = \frac{q}{nkT}[V_{D3} - I_3 R_S] \quad (6)$$

In certain embodiments, if '$I_0$' is eliminated and equations (4), (5), and (6) are reduced to two equations, the following equations (i.e., equations (7) and (8)) may be obtained.

$$\ln\left(\frac{I_1}{I_3}\right) = \frac{q}{nkT}[(V_{D1} - V_{D3}) - (I_1 - I_3)R_S] \quad (7)$$

$$\ln\left(\frac{I_2}{I_3}\right) = \frac{q}{nkT}[(V_{D2} - V_{D3}) - (I_2 - I_3)R_S] \quad (8)$$

In some embodiments, from equations (7) and (8), '$R_s$' may be eliminated when solving for 'T'. In certain embodiments, 'I' may be eliminated, using $I = (V - V_D)/R$, such that the resulting equation may be in terms of applied voltage 'V'. In various embodiments, an elimination of '$R_s$' and 'I' may result in equation (9) shown below.

$$T = \frac{q}{nk} \frac{V_{D1} - V_{D3} - \frac{V_1 - V_3 - V_{D1} + V_{D3}}{V_2 - V_3 - V_{D2} + V_{D3}}(V_{D2} - V_{D3})}{\ln\left(\frac{V_1 - V_{D1}}{V_3 - V_{D3}}\right) - \frac{V_1 - V_3 - V_{D1} + V_{D3}}{V_2 - V_3 - V_{D2} + V_{D3}} \ln\left(\frac{V_2 - V_{D2}}{V_3 - V_{D3}}\right)} \quad (9)$$

In certain embodiments, using equation (9), a temperature value, in Kelvin, may be determined using three sequentially applied voltages across the temperature sensor and each respective measured and/or detected output voltage. In most embodiments, temperature sensor may operate efficiently and/or optimally when the second input voltage ($V_2$) is twice or thrice the value of the first input voltage ($V_1$) and the third input voltage ($V_3$) is twice or thrice the value of the second input voltage ($V_2$).

In various embodiments, a temperature sensor and/or temperature sensing module may be operable when various amperages and various voltages are applied to the temperature sensor. Typically, use of high voltage and/or high amperage causes a diode to self-heat, which can affect temperature measurements close the diode. However, in most embodiments, effects of self-heating may be minimized by implementing a small heater or heating element in close proximity to the diode. In various embodiments, a small heater or heating element may be within a temperature sensing module. In other embodiments, a small heater or heating element may be proximate to a temperature sensing module. In some embodiments, a small heater or heating element may be proximate to a temperature sensing module, but operated separately from the temperature sensing module. In certain embodiments, a temperature sensing module and/or temperature sensor may be incorporated within an integrated circuit (e.g., part of a silicon). In some embodiments, a temperature sensing module and/or temperature sensor may be separate from a device and/or circuit being measured. In certain embodiments, a small heater in combination with a diode may maintain a constant amount of power dissipation throughout operation of a temperature sensor and/or temperature module such that the diode's self heating does not affect temperature measurement. For example, in some embodiments, a combined amount of power dissipation (i.e., heat) given off by a diode, within a temperature sensor, and a small heater proximate to the temperature sensor may be set to remain constant. In other embodiments, when a current is applied to a diode, which causes the diode to self-heat, a small heater proximate to the diode may reduce an amount of heat given off by the small heater so that a total amount of power dissipation proximate to the diode may remain constant.

Refer now to the example embodiment of FIG. 1, which shows a high level component diagram of a system implementing a diode temperature sensor module within an application specific integrated circuit (ASIC), in accordance with one or more aspects of the disclosure. The system 100 includes ASIC 105, which includes bond pads 115, temperature insensitive components 110 and 135, temperature sensitive components 120 and 130, and temperature sensing module 125. The temperature sensing module 125 is incorporated into the ASIC 105 to reliably detect ambient temperature proximate to the temperature sensor components 120 and 130. In most embodiments, the temperature sensor module may be enabled to detect a temperature value within +/−0.02 degrees Celsius. In other embodiments, one or more temperature sensing modules and/or temperature sensors may be implemented in various locations through the ASIC. In various embodiments, the diode temperature sensor module may be implemented within other types of circuits including, but not limited to a microprocessor, application specific integrated circuit, a photonic circuit, a field programmable gate array (FPGA), and/or other types of circuits.

Figure 2:
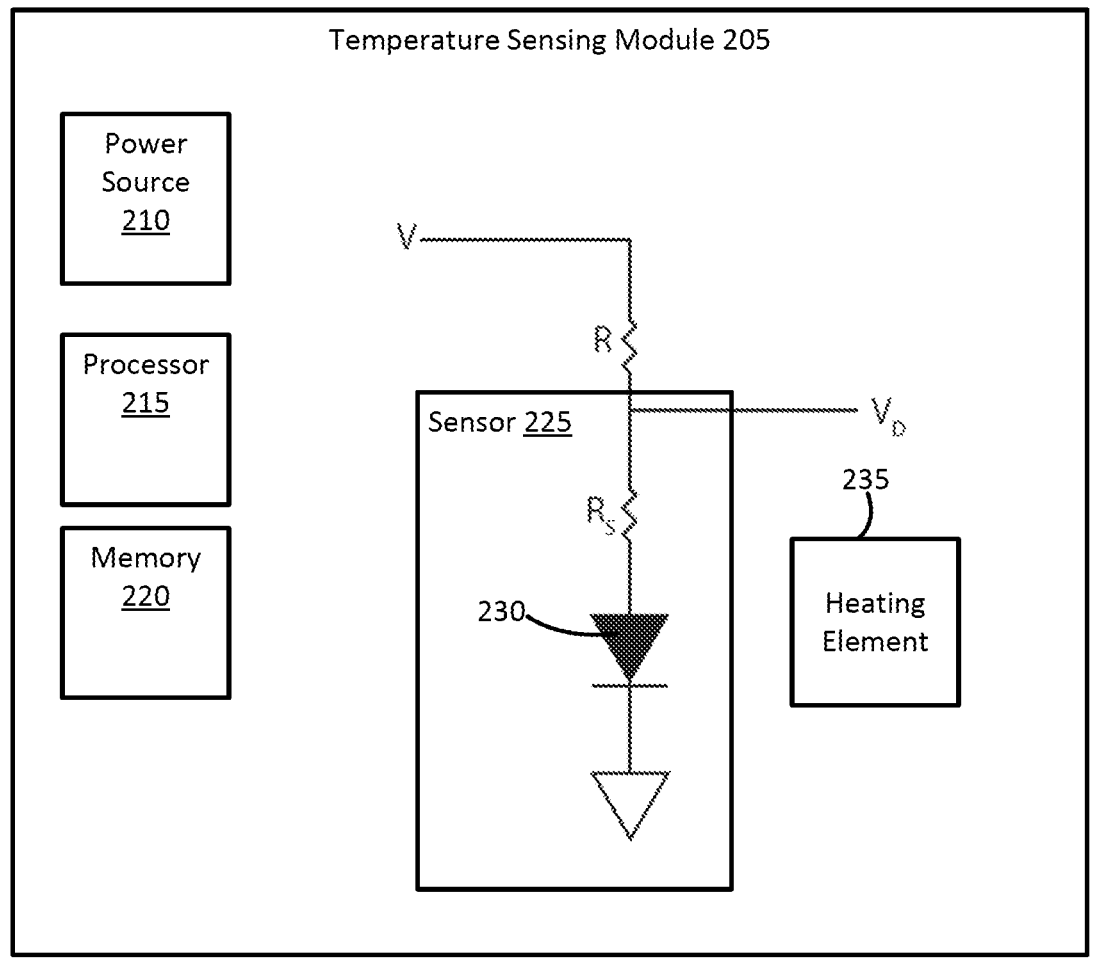
FIG. 2 illustrates an internal diagram of a diode temperature sensor, in accordance with one or more aspects of the disclosure.

Refer now to the example embodiment of FIG. 2, which shows an internal diagram of a diode temperature sensor, in accordance with one or more aspects of the disclosure. As shown in FIG. 2, a diode temperature sensor 205 includes a power source 210, a processor 215, a memory 220, a sensor 225, and a heating element 235. As shown, the sensor is the diode 30 and its internal series resistance Rs. In this embodiment, the R is the attached series resistor to drive 3 currents by applying 3 voltages. The sensor 225 is comprised of a diode 230 and a resistor in series 'R$_s$', where the sensor 225 accepts an input voltage 'V' and outputs voltage 'V$_d$'. During operation of the sensor 225, the heating element 235 and any heat dissipated by the diode 230 combine to generate a constant amount of heat dissipation. The heating element 235 modifies an amount of heat dissipated based on how much voltage and/or current are sent through the diode 230.

In some embodiments, a temperature sensing module may include a subset of components shown in FIG. 2. For example, in one embodiment, a temperature sensing module may be incorporated into an application specific integrated circuit (ASIC). In these embodiments, the temperature sensing module may obtain required power from the ASIC instead of including a power source. In an alternate embodiment, a temperature sensing module may rely upon a processor and/or memory from an incorporated ASIC instead of a processor and/or memory incorporated within the temperature sensing module.

Figure 3:
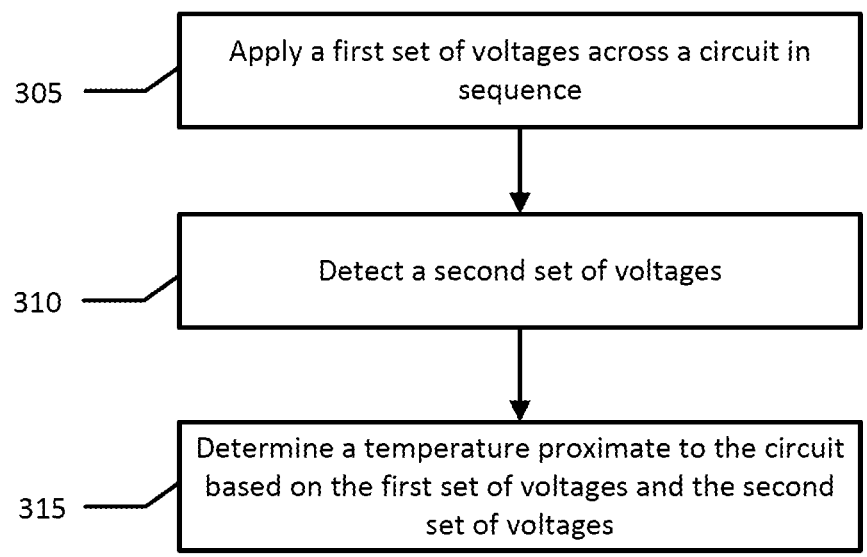
FIG. 3 is a flowchart of a method of using a diode temperature sensor, in accordance with one or more aspects of the disclosure.

Refer now to the example embodiments of FIGS. 2 and 3. FIG. 3 shows an example flowchart of a method of determining temperature, in accordance of one or more aspects of the disclosure. As shown in FIG. 3, a first set of voltages are sequentially applied across a sensor 225 (step 305). The sensor 225 includes a diode 230 and a resistor in series 'R$_s$'. In this example, the first set of voltages includes a first applied voltage (V$_1$), a second applied voltage (V$_2$), and a third applied voltage (V$_3$). Next, a second set of voltages are detected and/or measured at the sensor 225 from output voltage 'V$_D$'. (step 310). An output is detected for a first detected voltage (V$_{D1}$), a second detected voltage (V$_{D2}$), and a third detected voltage (V$_{D3}$), where each of the detected voltages (V$_{D1}$, V$_{D2}$, V$_{D3}$) correspond to the applied voltages (V$_1$, V$_2$, V$_3$) respectively. A temperature value detected by the temperature sensor is calculated according to the following equation:

$$T = \frac{q}{nk} \frac{V_{D1} - V_{D3} - \frac{V_1 - V_3 - V_{D1} + V_{D3}}{V_2 - V_3 - V_{D2} + V_{D3}}(V_{D2} - V_{D3})}{\ln\left(\frac{V_1 - V_{D1}}{V_3 - V_{D3}}\right) - \frac{V_1 - V_3 - V_{D1} + V_{D3}}{V_2 - V_3 - V_{D2} + V_{D3}} \ln\left(\frac{V_2 - V_{D2}}{V_3 - V_{D3}}\right)} \quad (10)$$

According to equation 10, temperature proximate to the diode is determined based on the first set of voltages (V$_1$, V$_2$, and V$_3$) and the second set of voltages (V$_{D1}$, V$_{D2}$, and V$_{D3}$) (step 315), where 'q' is the charge of an electron (e.g., 1.60217662×10$^{-19}$ coulombs), 'n' is the ideality factor of the diode, and k is the Boltzmann's constant (e.g., 1.38064852× 10$^{-23}$ m$^2$ kg s$^{-2}$ K$^{-1}$). In many embodiments, the ideality factor of the diode may be between 1 and 2.

During operation, when voltage is applied to the diode 230, the diode 230 dissipates heat. To minimize effects of the dissipated heat from the diode 230, the heater 235, in combination with the diode 230, maintains a constant amount of heat dissipation surrounding the sensor 225. In most embodiments, operation of a heater (e.g., heater 235) closely coincides with a voltage applied to an associated diode (e.g., diode 230). In other embodiments, a sensor (e.g., sensor 225) may be operated without use of an associated heater (e.g., heater 235). In certain embodiments, when a heater is not used in combination with a sensor, a potential heat dissipation from a diode (e.g., diode 230) may be taken into account during use of the sensor. In some embodiments, a heater and associated diode may operate simultaneously. In other embodiments, a heater and associated diode may operate contemporaneously.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

What is claimed is:

1. A method of measuring a temperature, the method comprising:
    applying a first set of voltages across a circuit in sequence, wherein the circuit comprises a diode and a resistor in series, wherein the first set of voltages includes a first applied voltage ($V_1$), a second applied voltage ($V_2$), and a third applied voltage ($V_3$);
    detecting a second set of voltages across the said diode corresponding to the first set of voltages, wherein the second set of voltages includes a first detected voltage ($V_{D1}$), a second detected voltage ($V_{D2}$), and a third detected voltage ($V_{D3}$), wherein the first applied voltage ($V_1$) corresponds to the first detected voltage ($V_{D1}$), the second applied voltage ($V_2$) corresponds to the second detected voltage ($V_{D2}$), and a third applied voltage ($V_3$) corresponds to the third detected voltage ($V_{D3}$); and
    determining a temperature proximate to the diode based on the first set of voltages and the second set of voltages.

2. The method of claim 1, wherein the temperature measurement is performed relative to an integrated temperature sensor positioned relative to an application specific integrated circuit (ASIC).

3. The method of claim 1, wherein the temperature measurement is performed relative to an integrated temperature sensor positioned relative to one or more components of a photonic circuit.

4. The method of claim 1, wherein the second applied voltage ($V_2$) is about two times the first applied voltage ($V_1$).

5. The method of claim 1, wherein the third applied voltage ($V_3$) is about two times the second applied voltage ($V_2$).

6. The method of claim 1, wherein determining the temperature includes:
    calculating the temperature according to the equation of $$T = \frac{q}{nk} \frac{V_{D1} - V_{D3} - \frac{V_1 - V_3 - V_{D1} + V_{D3}}{V_2 - V_3 - V_{D2} + V_{D3}}(V_{D2} - V_{D3})}{\ln\left(\frac{V_1 - V_{D1}}{V_3 - V_{D3}}\right) - \frac{V_1 - V_3 - V_{D1} + V_{D3}}{V_2 - V_3 - V_{D2} + V_{D3}} \ln\left(\frac{V_2 - V_{D2}}{V_3 - V_{D3}}\right)}$$

based on the first set of voltages and the second set of voltages, wherein 'q' is the charge of an electron, 'n' is the ideality factor of the diode, and k is the Boltzmann's constant.

7. The method of claim 1, further comprising modifying an output of a heater proximate to the diode within the circuit, wherein a combined heat dissipation of the heater and the diode remains constant during operation of the circuit.

8. A method of periodically measuring a temperature proximate to a circuit, the method comprising:
    periodically applying voltages across a temperature sensitive diode wherein the voltages includes a first voltage ($V_1$), second voltage ($V_2$), and a third voltage ($V_3$);
    measuring a first measured voltage ($V_{D1}$), second measured voltage ($V_{D2}$), and a third measured voltage ($V_{D3}$) corresponding to the first voltage ($V_1$), second voltage ($V_2$), and third voltage respectively ($V_3$), respectively; and
    determining the temperature proximate to the circuit based on the first voltage ($V_1$), second voltage ($V_2$), third voltage ($V_3$), first measured voltage ($V_{D1}$), second measured voltage ($V_{D2}$), and third measured voltage ($V_{D3}$).

9. The method of claim 8, wherein determining the temperature includes:
    calculating the temperature according to the equation of $$T = \frac{q}{nk} \frac{V_{D1} - V_{D3} - \frac{V_1 - V_3 - V_{D1} + V_{D3}}{V_2 - V_3 - V_{D2} + V_{D3}}(V_{D2} - V_{D3})}{\ln\left(\frac{V_1 - V_{D1}}{V_3 - V_{D3}}\right) - \frac{V_1 - V_3 - V_{D1} + V_{D3}}{V_2 - V_3 - V_{D2} + V_{D3}} \ln\left(\frac{V_2 - V_{D2}}{V_3 - V_{D3}}\right)}$$

based on the first voltage ($V_1$), the second voltage ($V_2$), the third voltage ($V_3$), the first measured voltage ($V_{D1}$), the second measured voltage ($V_{D2}$), and the third measured voltage ($V_{D3}$), wherein 'q' is the charge of an electron, 'n' is the ideality factor of the diode, and k is the Boltzmann's constant.

10. The method of claim 8, wherein the temperature measurement is performed relative to an integrated temperature sensor positioned relative to the circuit.

11. The method of claim 8, wherein the second applied voltage ($V_2$) is about two times the first applied voltage ($V_1$) and the third applied voltage ($V_3$) is about two times the second applied voltage ($V_2$).

12. The method of claim 8, further comprising modifying an output of a heater proximate to the diode, wherein a combined heat dissipation of the heater and the diode remains constant during operation of the diode.

13. The method of claim 8, wherein the circuit is a microprocessor.

14. The method of claim 8, wherein the circuit is a field programmable gate array (FPGA).

15. A system, comprising:
    a temperature sensor including:
        a power source;
        a diode electrically connected to the power source;
        a resistor in series with the diode; and
        a heater proximate to the diode;
        wherein the power source is operable to apply a voltage across the diode; and
    a circuit configured to:
        apply a first set of voltages across the diode, wherein the first set of voltages includes a first applied voltage ($V_1$), a second applied voltage ($V_2$), and a third applied voltage ($V_3$);
        detect a second set of voltages, wherein the second set of voltages includes a first detected voltage ($V_{D1}$), a second detected voltage ($V_{D2}$), and a third detected voltage ($V_{D3}$); and
        determine the temperature proximate to the circuit based on the first set of voltages and the second set of voltages.

16. The system of claim 15, wherein determining the temperature includes:

calculating the temperature according to the equation of $$T = \frac{q}{nk} \frac{V_{D1} - V_{D3} - \frac{V_1 - V_3 - V_{D1} + V_{D3}}{V_2 - V_3 - V_{D2} + V_{D3}}(V_{D2} - V_{D3})}{\ln\left(\frac{V_1 - V_{D1}}{V_3 - V_{D3}}\right) - \frac{V_1 - V_3 - V_{D1} + V_{D3}}{V_2 - V_3 - V_{D2} + V_{D3}}\ln\left(\frac{V_2 - V_{D2}}{V_3 - V_{D3}}\right)}$$

based on the first set of voltages and the second set of voltages, where 'q' is the charge of an electron, 'n' is the ideality factor of the diode, and k is the Boltzmann's constant.

17. The system of claim 15, wherein the first set of voltages are applied sequentially across the diode.

18. The system of claim 15, wherein the circuit is further configured to modify an output of the heater proximate to the diode, wherein a combined heat dissipation of the heater and the diode remains constant during operation of the circuit.

19. The system of claim 15, wherein the circuit is a microprocessor.

20. The system of claim 15, wherein the circuit is an application specific integrated circuit.

\* \* \* \* \*